US008519011B2

(12) United States Patent
Saxton et al.

(10) Patent No.: US 8,519,011 B2
(45) Date of Patent: Aug. 27, 2013

(54) PROCESS OF SYNTHESIS GAS CONVERSION TO LIQUID HYDROCARBON MIXTURES USING ALTERNATING LAYERS OF SYNTHESIS GAS CONVERSION CATALYST, HYDROCRACKING AND HYDROISOMERIZATION CATALYST

(75) Inventors: Robert J. Saxton, Pleasanton, CA (US); Charles L. Kibby, Benicia, CA (US); Kandaswamy Jothimurugesan, Hercules, CA (US); Tapan Das, Albany, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 253 days.

(21) Appl. No.: 13/208,195

(22) Filed: Aug. 11, 2011

(65) Prior Publication Data

US 2012/0108682 A1    May 3, 2012

Related U.S. Application Data

(60) Provisional application No. 61/407,773, filed on Oct. 28, 2010.

(51) Int. Cl.
*C07C 27/00* (2006.01)

(52) U.S. Cl.
USPC ............ 518/700; 518/713; 518/714; 518/715

(58) Field of Classification Search
USPC .................................. 518/700, 713, 714, 715
See application file for complete search history.

(56) References Cited

U.S. PATENT DOCUMENTS

| | | | |
|---|---|---|---|
| 4,279,830 A | 7/1981 | Haag et al. |
| 4,294,725 A | 10/1981 | Fraenkel et al. |
| 4,304,871 A | 12/1981 | Brennan et al. |
| 4,492,744 A | 1/1985 | Brown et al. |
| 4,556,645 A | 12/1985 | Coughlin et al. |
| 4,585,798 A | 4/1986 | Beuther et al. |
| 4,605,679 A | 8/1986 | Kobylinski et al. |
| 4,617,288 A | 10/1986 | Bell et al. |
| 4,670,414 A | 6/1987 | Kobylinski et al. |
| 4,822,824 A | 4/1989 | Iglesia et al. |
| 5,036,032 A | 7/1991 | Iglesia et al. |
| 5,128,377 A | 7/1992 | Behrmann et al. |
| 5,140,050 A | 8/1992 | Mauldin et al. |
| 5,168,091 A | 12/1992 | Behrmann et al. |
| 5,292,705 A | 3/1994 | Mitchell |
| 5,331,574 A | 7/1994 | Temoshenko et al. |
| 5,424,264 A | 6/1995 | Richard et al. |
| 5,545,674 A | 8/1996 | Behrmann et al. |
| 5,728,918 A | 3/1998 | Nay et al. |
| 5,733,839 A | 3/1998 | Espinoza et al. |
| 6,191,066 B1 | 2/2001 | Singleton et al. |
| 6,225,359 B1 | 5/2001 | O'Rear et al. |
| 6,245,709 B1 | 6/2001 | Clark et al. |
| 6,262,131 B1 | 7/2001 | Arcuri et al. |
| 6,313,062 B1 | 11/2001 | Krylova et al. |
| 6,331,575 B1 | 12/2001 | Mauldin |
| 6,465,529 B1 | 10/2002 | Daage et al. |
| 6,472,441 B1 | 10/2002 | Kibby |
| 6,491,880 B1 | 12/2002 | Wang et al. |
| 6,521,565 B1 | 2/2003 | Clavenna et al. |
| 6,531,517 B1 | 3/2003 | Wachter et al. |
| 6,638,899 B1 | 10/2003 | Wakiya et al. |
| 6,649,662 B2 | 11/2003 | Kibby |
| 6,706,661 B1 | 3/2004 | Krylova et al. |
| 6,753,351 B2 | 6/2004 | Clark et al. |
| 7,045,486 B2 | 5/2006 | Wang et al. |
| 7,157,501 B2 | 1/2007 | Steenwinkel et al. |
| 7,300,959 B2 | 11/2007 | Vogt et al. |
| 7,361,619 B2 | 4/2008 | Malek et al. |
| 7,384,986 B2 | 6/2008 | Huang et al. |
| 7,507,326 B2 | 3/2009 | Farshid et al. |
| 2001/0027259 A1 | 10/2001 | Fujimoto et al. |
| 2003/0087970 A1 | 5/2003 | Wittenbrink et al. |
| 2003/0088138 A1 | 5/2003 | Mart et al. |
| 2003/0149210 A1 | 8/2003 | Hurtevent et al. |
| 2004/0204504 A1 | 10/2004 | Malek et al. |
| 2007/0225383 A1 | 9/2007 | Cortright et al. |
| 2010/0144907 A1 | 6/2010 | Kibby et al. |

FOREIGN PATENT DOCUMENTS

| | | |
|---|---|---|
| EP | 0153517 | 9/1985 |
| EP | 2067762 | 6/2009 |
| JP | 2010001241 | 1/2010 |
| RU | 2295387 | 3/2007 |
| WO | WO 94/04476 | 3/1994 |
| WO | WO 99/61550 | 12/1999 |

(Continued)

OTHER PUBLICATIONS

PCT International Search Report, PCT/US2011/052551, filed Sep. 21, 2011, Mail Date: Apr. 16, 2012.
Xiaohong Li, et al., Direct synthesis of middle iso-paraffins from synthesis gas, 2003, Catalysis Today.
Xiaohong Li, et al., Synthesis of isoparaffins from synthesis gas, 2004, Studies in Surface Science and Catalysis.
Zheng-Wen Lin, et al., Selective Production of Gasoline-Ranged Isoparaffins Over Co/Sio2, and Metal Catalysts From Syngas, 2004, Prepr. Pap.-Am Chem. Soc., Div. Fuel Chem.
Zhong-Wen Liu, et al., Iso-paraffins synthesis from modified Fischer-Tropsch reaction—Insights into Pd/beta Pt/beta catalysts, 2005, Catalysis Today.
Zhong-Wen Liu, et al., Formation of Isoparaffins through Pd/Zeolite Application in Fischer-Tropsch Synthesis, 2005, Energy & Fuels.
Zhong-Wen Liu, Insights into a Multifunctional Hybrid Catalyst Composed of Co/SiO2 and Pd/Beta for Isoparaffin Production from Syngas, 2005, Ind. Eng. Chem. Res.

(Continued)

*Primary Examiner* — Jafar Parsa (74) *Attorney, Agent, or Firm* — Karen R. DiDomenicis; Richard Schulte (57) ABSTRACT

Disclosed is a process for converting synthesis gas to liquid hydrocarbon mixtures useful in the production of fuels and petrochemicals. The synthesis gas is contacted with at least two layers of synthesis gas conversion catalyst wherein each synthesis gas conversion catalyst layer is followed by a layer of hydrocracking catalyst and hydroisomerization catalyst or separate layers of hydrocracking and hydroisomerization catalysts. The process can occur within a single reactor, at an essentially common reactor temperature and an essentially common reactor pressure. The process provides a high yield of naphtha range liquid hydrocarbons and a low yield of wax.

20 Claims, 3 Drawing Sheets

(56) References Cited

FOREIGN PATENT DOCUMENTS

| WO | WO 00-00571 | 1/2000 |
|---|---|---|
| WO | WO 03/002252 | 1/2003 |
| WO | WO 2009/031756 | 3/2009 |

OTHER PUBLICATIONS

Zhong-Wen Liu, High performance Pd/beta catalyst for the production of gasoline-ranfe iso-paraffins via a modified Fischer-Tropsch reaction, 2006, Applied Catalysts.

Martinez, et al., The Application of Zeolites and Periodic Mesoporous Silicas in the Catalytic Conversion of Synthesis Gas, 2009, Top Catal.

NA, et al., Study on selective synthesis of gasoline-range iso-paraffins from CO +H2 via Fischer-Tropsch route, 2009, Industrial Catalysis.

Nam, et al., Production of Middle Distillate from Synthesis Gas in a Dual-bed Reactor Through Hydrocracking of Wax Over Mesoporous Pd-AI2O3 Composite Catalyst, 2009, Catal Lett.

Subiranas, et al., Combining Fischer-Tropsch(FT) and Hydrocarbon Reactions under FT Reaction Conditions-Catalyst and Reactor Studies with Co or Fe and Pt/ZSM-5, 2007, International Journal of Chemical Reactor Engineering.

Subiranas, et al., Combining Fischer-Tropsch (FT) and Hydrocarbon Reactions under FT Reaction Conditions: Model Compound and Combined-Catalyst Studies, 2009, International Journal of Chemical Reactor Engineering.

Zhao, et al., Selective Synthesis of Middle Isoparaffins via a Two-Stage Fischer-Tropsch Reaction:Activity Investigation for a Hybrid Catalyst, 2005, Ind. Eng. Chem. Res.

PROCESS OF SYNTHESIS GAS CONVERSION TO LIQUID HYDROCARBON MIXTURES USING ALTERNATING LAYERS OF SYNTHESIS GAS CONVERSION CATALYST, HYDROCRACKING AND HYDROISOMERIZATION CATALYST

This application claims the benefit of provisional U.S. Patent Application No. 61/407,773, filed Oct. 28, 2010.

BACKGROUND

1. Field

The disclosure relates to an improved process for converting synthesis gas to liquid hydrocarbon mixtures useful in the production of fuels and petrochemicals by contacting the synthesis gas with multiple catalysts in alternating layers within a single reactor tube.

2. Description of Related Art

The majority of combustible liquid fuels used in the world today are derived from crude oil. However, there are several limitations to using crude oil as a fuel source. For example, crude oil is in limited supply.

Alternative sources for developing combustible liquid fuel are desirable. An abundant resource is natural gas. The conversion of natural gas to combustible liquid fuel typically involves a first step of converting the natural gas, which is mostly methane, to synthesis gas, or syngas, which is a mixture of carbon monoxide and hydrogen. Fischer-Tropsch synthesis is a known means for converting syngas to higher molecular weight hydrocarbon products. Fischer-Tropsch products include naphtha which can be further upgraded to produce gasoline or liquefied petroleum gas (LPG). Fischer-Tropsch naphtha can also be blended with diesel fuel to modify low temperature properties. Fischer-Tropsch naphtha can also be converted to light olefins, such as, for example, ethylene. Olefins from Fischer-Tropsch naphtha can be converted to diesel, or further processed to form plastics. Fischer-Tropsch synthesis is often performed under conditions which produce a large quantity of $C_{21}$+ wax, also referred to as "Fischer-Tropsch wax," which must be hydroprocessed to provide distillate fuels. Often, the wax is hydrocracked to reduce the chain length, and then hydrotreated to reduce oxygenates and olefins to paraffins. Hydrocracking tends to reduce the chain length of all of the hydrocarbons in the feed. When the feed includes hydrocarbons that are already in a desired range, hydrocracking of these hydrocarbons is undesirable.

Considerably different process conditions are generally used for Fischer-Tropsch synthesis and for hydrocracking of Fischer-Tropsch wax using relatively acidic catalysts such as, for example, SSZ-32 or ZSM-5. For this reason commercial Fischer-Tropsch plants use separate reactors for the Fischer-Tropsch synthesis and for the subsequent hydrocracking of the product wax, and complicated and expensive separation schemes may be used to separate solid wax from lighter products.

Because the Fischer-Tropsch reaction is highly exothermic, the problem of how to remove reaction heat is a primary challenge in designing and operating Fischer-Tropsch reactors. Fixed bed reactors typically contain many narrow reactor tubes placed within a cooling medium to remove heat. Heat is also managed by practices such as running the reactor at a high gas flow rate and recycling a portion of the tail gas.

It would be advantageous to provide an economic process in which both synthesis gas conversion and product hydrocracking are combined within a single reactor at a common set of conditions resulting in a high yield of naphtha range liquid hydrocarbons and a low yield of wax. It would further be advantageous to provide such a process with improved heat management within the reactor.

SUMMARY

One embodiment provides a process for converting synthesis gas to a hydrocarbon mixture comprising contacting a feed comprising a mixture of carbon monoxide and hydrogen with at least two layers of synthesis gas conversion catalyst particles including a metal component, and at least two layers containing hydrocracking catalyst particles including an acidic component and hydroisomerization catalyst particles, in an alternating arrangement within a single reactor tube, such that the feed contacts at least a first synthesis gas conversion catalyst layer, a first hydrocracking and hydroisomerization catalyst layer, a second synthesis gas conversion catalyst layer and a second hydrocracking and hydroisomerization catalyst layer sequentially, thereby resulting in a hydrocarbon mixture which at ambient conditions contains:
  0-20 weight % $CH_4$;
  0-20 weight % $C_2$-$C_4$;
  greater than 70% $C_{5+}$; and
  40-80 weight % $C_5$-$C_{12}$.

Another embodiment provides a process for converting synthesis gas to a hydrocarbon mixture comprising contacting a feed comprising a mixture of carbon monoxide and hydrogen with at least two layers of synthesis gas conversion catalyst particles including a metal component, at least two layers of hydrocracking catalyst particles including an acidic component, and at least two layers of hydroisomerization catalyst particles, in an alternating layer arrangement within a single reactor tube, such that the feed contacts a first synthesis gas conversion catalyst layer, a first hydrocracking catalyst layer, a first hydroisomerization catalyst layer, a second synthesis gas conversion catalyst layer, sequentially, followed by a second hydrocracking catalyst layer and a second hydroisomerization catalyst layer, in any order, thereby resulting in a hydrocarbon mixture which at ambient conditions contains:
  0-20 weight % $CH_4$;
  0-20 weight % $C_2$-$C_4$;
  greater than 70% $C_{5+}$; and
  40-80 weight % $C_5$-$C_{12}$.

Yet another embodiment provides a process for converting synthesis gas to a hydrocarbon mixture comprising contacting a feed comprising a mixture of carbon monoxide and hydrogen with at least two layers of synthesis gas conversion catalyst particles including a metal component, at least two layers of hydrocracking catalyst particles including an acidic component, and at least two layers of hydroisomerization catalyst particles, in an alternating layer arrangement within a single reactor tube, such that the feed contacts a first synthesis gas conversion catalyst layer, a first hydroisomerization catalyst layer, a first hydrocracking catalyst layer, a second synthesis gas conversion catalyst layer, sequentially, followed by a second hydrocracking catalyst layer and a second hydroisomerization catalyst layer, in any order, thereby resulting in a hydrocarbon mixture which at ambient conditions contains:
  0-20 weight % $CH_4$;
  0-20 weight % $C_2$-$C_4$;
  greater than 70% $C_{5+}$; and
  40-80 weight % $C_5$-$C_{12}$.

DETAILED DESCRIPTION

A process is disclosed for the synthesis of liquid hydrocarbons in the distillate fuel range, particularly in the naphtha range, from synthesis gas feed in a single reactor tube. The term naphtha refers to the fraction of hydrocarbons boiling between 30° C. and 200° C., generally having between 5 and 12 carbon atoms. Within the reactor tube, a mixture of olefinic and paraffinic hydrocarbons is synthesized by contacting the synthesis gas with a first layer of synthesis gas conversion catalyst. The hydrocarbon mixture so formed is then contacted within the same reactor tube with a catalyst having hydroisomerization functionality and a catalyst having hydrocracking functionality. The hydrocracking catalyst includes an acidic component and optionally a metal in Group VIII of the Periodic Table of the Elements, also referred to as a group VIII metal (according to the Periodic Table of the Elements as provided in the Handbook of Chemistry and Physics, 62nd edition, 1981 to 1982, Chemical Rubber Company) for hydrogenating olefins. The hydrocracking and hydroisomerization catalysts can be mixed within a single layer, or can be in separate layers. The resulting hydrocarbon mixture is then contacted within the same reactor sequentially with another layer of synthesis gas conversion catalyst and followed by further layer(s) of hydrocracking and hydroisomerization catalyst. Multiple iterations of alternating layers of synthesis gas conversion catalyst and hydrocracking and hydroisomerization catalyst can be used.

Figure 1:
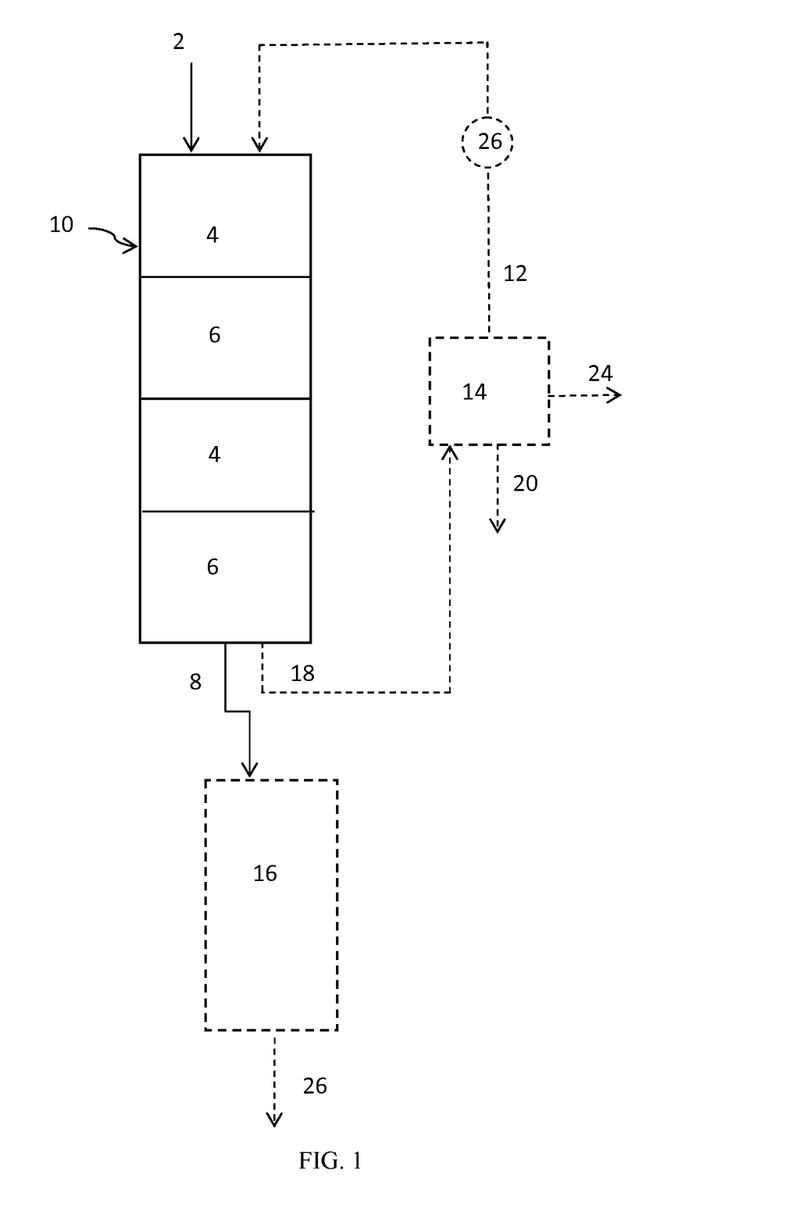
FIG. 1 is a schematic diagram illustrating a process for converting synthesis gas to liquid hydrocarbons according to one exemplary embodiment.

Referring to FIG. 1, one embodiment is illustrated for the synthesis of liquid hydrocarbons from a feed of synthesis gas 2 in fixed bed reactor 10. Within the reactor, multiple, small-diameter reactor tubes (not shown) are enclosed in a cooling medium, e.g., steam or water. Olefinic and paraffinic hydrocarbons are formed by contacting the synthesis gas with a synthesis gas conversion catalyst in a first, upstream catalyst layer 4. The hydrocarbon mixture so formed can range from methane to light wax, containing only trace amounts (<0.5 wt %) of carbon numbers above 30, and may include linear, branched and cyclic compounds. As defined herein, the terms "wax" and "solid wax" refer to $C_{21+}$ normal paraffins. The terms "Fischer-Tropsch wax" and "$C_{21+}$ wax" are also used herein interchangeably to refer to $C_{21+}$ normal paraffins. The hydrocarbon mixture is then contacted within the same reactor tube downstream of the first catalyst layer with a second, downstream catalyst layer 6. The downstream layer 6 contains a combination of a catalyst having an acidic component for hydrocracking the linear hydrocarbons, e.g. Pd/ZSM-5 or Pt/ZSM-5, and a hydroisomerization component, e.g. a noble metal-promoted zeolite of the SSZ-32 family. The hydrocracking catalyst can optionally also include a group VIII metal for hydrogenating olefins. The upstream layer performs synthesis gas conversion while the downstream layer performs both hydrocracking and hydroisomerization.

The multiple, alternating upstream and downstream catalyst layers are arranged in series. While only two upstream catalyst layers 4 and two downstream catalyst layers 6 are shown, more alternating layers can be used. The choice of the number of alternating layers can be made based on a number of factors, including the length of the reactor and the particle size of the catalysts. In one embodiment, the minimum thickness of each catalyst layer is at least two times the diameter of the catalyst particles; in another embodiment, the minimum thickness of each catalyst layer is at least three times the diameter of the catalyst particles. Practically speaking, the number of catalyst layers will range between four (two upstream and two downstream, alternating) and $L/2d_p$, where L is the length of the reactor and $d_p$ is the total average particle diameter of all catalyst particles in the reactor, i.e., synthesis gas conversion catalyst particles, acidic hydrocracking catalyst particles and hydroisomerization catalyst particles, assuming all the particles have approximately the same diameter. The synthesis gas conversion, acidic hydrocracking and hydroisomerization catalyst particles can each have an average particle diameter which is between about 0.05 and 0.1 times the diameter of the reactor tubes. The particle size is selected to be sufficiently fine to avoid channeling of the feed and sufficiently coarse to avoid high-pressure drops across the reactor. For example, catalyst particle size for fixed bed operation is typically between about 1 and about 5 mm. Particle diameter can be determined using any means known to one skilled in the art, including, but not limited to, sieving or screening, observing the rate of sedimentation, observation via microscopy, etc. In one embodiment, up to 10 alternating catalyst layers are used; in another embodiment, up to 20 alternating layers are used.

Alternatively, the hydrocracking catalyst and hydroisomerization catalyst are not necessarily within the same catalyst layer. In one embodiment, shown in FIG. 2, the hydrocarbon mixture formed in the first synthesis gas conversion layer 4 is then contacted within the same reactor downstream of the first catalyst layer with a hydrocracking catalyst layer 5, followed by a hydroisomerization catalyst layer 7. After the hydrocarbon mixture has been contacted with both the hydrocracking and hydroisomerization catalysts, it contacts another synthesis gas conversion catalyst layer 4, followed by further layers of hydrocracking catalyst and hydroisomerization catalyst. The order of the hydrocracking and hydroisomerization catalyst layers can be varied. For instance, in the embodiment shown in FIG. 3, the hydrocarbon mixture formed in the first synthesis gas conversion layer 4 is then contacted within the same reactor downstream of the first catalyst layer with hydroisomerization catalyst layer 7, followed by hydrocracking catalyst layer 5. The hydrocarbon mixture is then contacted with another synthesis gas conversion layer 4, followed by further layers of hydrocracking catalyst and hydroisomerization catalyst. In either embodiment shown in FIGS. 2 and 3, the order of the layers of hydrocracking catalyst and hydroisomerization catalyst can be transposed between layers of synthesis gas conversion catalyst.

Figure 2:
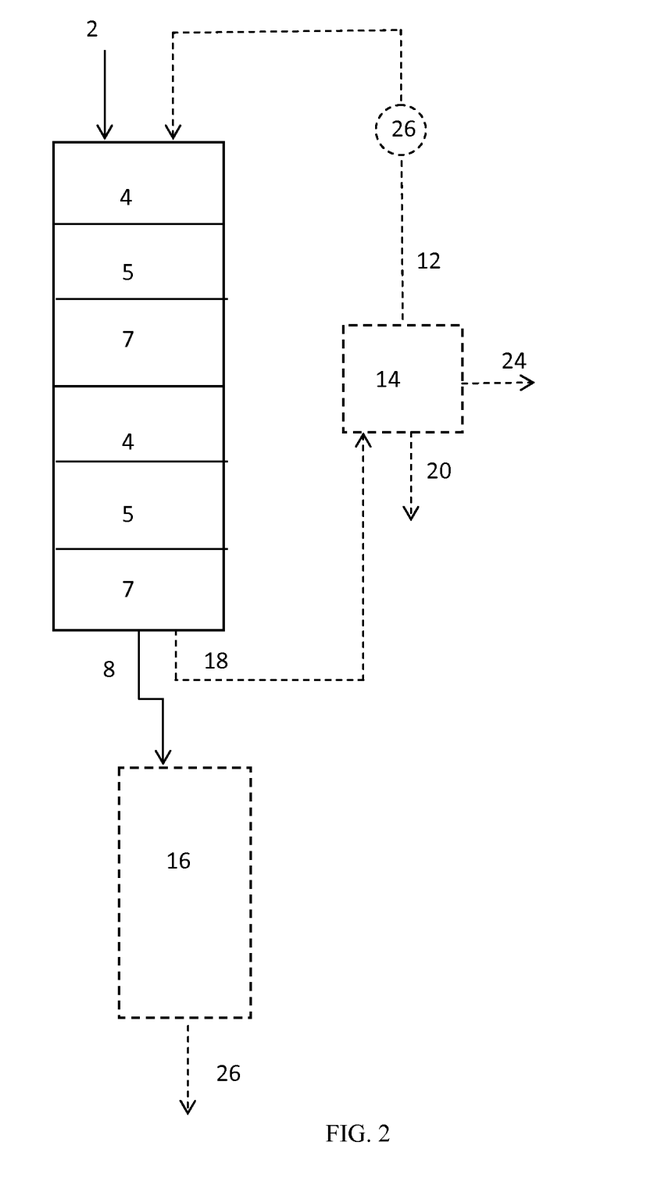
FIG. 2 is a schematic diagram illustrating a process for converting synthesis gas to liquid hydrocarbons according to another exemplary embodiment.
Figure 3:
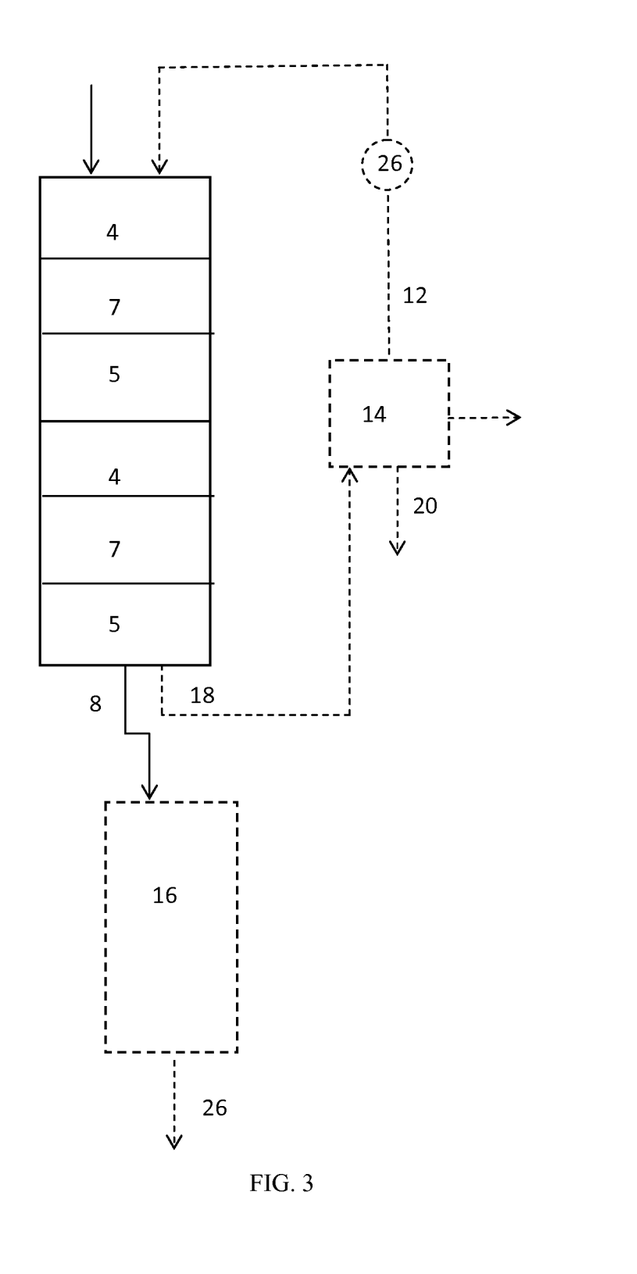
FIG. 3 is a schematic diagram illustrating a process for converting synthesis gas to liquid hydrocarbons according to yet another exemplary embodiment.

Again, in FIGS. 2 and 3, while only two synthesis gas conversion catalyst layers 4, two hydrocracking catalyst layers 5 and two hydroisomerization catalyst layers 7 are shown, more alternating layers can be used. Practically speaking, the number of catalyst layers will range between six (two synthesis gas conversion catalyst layers, two hydrocracking catalyst layers and two hydroisomerization catalyst layers, alternating) and $L/2d_p$, where L is the length of the reactor and $d_p$ is the total average particle diameter of all catalyst particles in the reactor, i.e., synthesis gas conversion catalyst particles, acidic hydrocracking catalyst particles and hydroisomerization catalyst particles, assuming all the particles have approximately the same diameter.

It is not necessary to include any diluent material between catalyst layers to separate the layers or within each catalyst layer to reduce heat generated. However, such diluent material can be used if so desired.

The synthesis gas conversion and the subsequent hydrocracking and hydroisomerization are conveniently carried out in a single reactor tube under essentially common reaction conditions. Therefore it is not necessary to provide an additional separate reactor downstream of the conversion reactor for hydrocracking and optional hydroisomerization. By "essentially common reaction conditions" is meant that the temperature of the cooling medium within the reactor tube 10 is constant from one point to another within a few degrees Celsius (e.g., 0-3° C.) and the pressure within the reactor is allowed to equilibrate between the multiple layers. Optionally, although not preferably, more than one cooling system may be used in the reactor containing the multiple reactor tubes 10 utilizing more than one cooling medium physically separated from each other, in which case the cooling media may be at differing temperatures. The temperatures and pressures of the multiple, alternating catalyst layers can differ somewhat, although advantageously it is not necessary to separately control the temperature and pressure of the catalyst layers. The layer temperatures will depend on the relative exotherms of the reactions proceeding within them. Exotherms generated by synthesis gas conversion are greater than those generated by hydrocracking and hydroisomerization. An advantage of the present embodiments over a "single stacked bed" arrangement having only a single syngas conversion layer and a single hydrocracking layer is that the relative exotherms of each layer will be moderated such that the temperature differential between multiple alternating layers will be lower than the temperature differential between the layers in a single stacked bed arrangement. The improved heat management of the multiple alternating layers results in extended catalyst life and performance.

As shown in FIGS. 1-3, a feed of synthesis gas 2 is introduced to the reactor tube via an inlet (not shown). The ratio of hydrogen to carbon monoxide of the feed gas is generally high enough that productivity and carbon utilization are not negatively impacted by not adding hydrogen in addition to the hydrogen of the syngas into the reactor or producing additional hydrogen using water-gas shift. The ratio of hydrogen to carbon monoxide of the feed gas is also generally below a level at which excessive methane would be produced. Advantageously, the ratio of hydrogen to carbon monoxide is between about 1.0 and about 2.2, even between about 1.5 and about 2.2. If desired, pure synthesis gas can be employed or, alternatively, an inert diluent, such as nitrogen, $CO_2$, methane, steam or the like can be added. The phrase "inert diluent" indicates that the diluent is non-reactive under the reaction conditions or is a normal reaction product. Depending on process conditions such as reactor pressure, it can be advantageous to operate the syngas conversion process in a partial conversion mode, for instance 50-60 wt % conversion of CO within the feed gas, and to condense the liquid products, especially water, before either recycling the dry tail gas or sending it to an additional reactor stage. Optionally, recycle stream 18 is passed through separator 14 which utilizes a drop in temperature to condense water 20 and separate oil 24 and gas stream 12. Gas stream 12 is recycled to the reactor tube 10 via compressor 26. Oil 24 is optionally recycled to the reactor tube 10. The conversion rate drops rapidly as the partial pressures of the reactants decrease, and the water produced can damage the catalyst if its pressure gets too high. Therefore recycling the tail gas and/or staging permits operation at a low average $H_2$/CO ratio in the reactor, minimizing methane formation while allowing hydrogen to be used at a high ratio (e.g., at least 2.1) to form paraffinic products.

The proportion of hydrocracking and hydroisomerization catalysts between layers 5 and 7 is advantageously optimized to balance the isomerization activity with the cracking activity. If there is excessive cracking catalyst the resulting product may be lighter than desired. The cracking catalyst converts the n-paraffin wax product to a suitable chain length while the hydroisomerization component isomerizes the n-paraffin product. If the desire is to produce a heavier product, then the catalyst combination should exhibit less cracking and more isomerization. By including Pd/SSZ-32, for example, in layer 7, it has been found that more isomerization can be achieved. If there is insufficient cracking catalyst the hydroisomerization catalyst may be unable to convert the wax to liquid products. In one embodiment, the weight ratio of the acidic component of the hydrocracking catalyst to the isomerization component of the hydroisomerization catalyst is between 0.1:1 and 100:1. In another embodiment, the weight ratio of the acidic component of the hydrocracking catalyst to the isomerization component of the hydroisomerization catalyst is between 5:1 and 1:5

The amounts of hydrocracking and hydroisomerization catalysts in layers 5 and 7 can be suitably varied to obtain the desired product. The amount of hydrocracking and hydroisomerization catalysts in layers 5 and 7 needed will in part depend on the tendency of the synthesis gas conversion catalyst in layers 4 to produce wax and will in part depend on process conditions. The weight ratio of the acidic component of the hydrocracking catalyst and the isomerization component of the hydroisomerization catalyst to the metal component of the synthesis gas conversion catalyst, i.e., the weight ratio of active components, can be between 1:1 and 1000:1. The weights of the acidic component of the hydrocracking catalyst, the isomerization component of the hydroisomerization catalyst and the metal component of the synthesis gas conversion catalyst are intended herein to include the weight of the active catalyst material as well as any optional metal promoters, but not the weight of any binder materials. If the ratio is below this range, the resulting product can undesirably contain solid wax. If the ratio is above this range, the product can be undesirably light. In one embodiment, the weight ratio of active components of hydrocracking and hydroisomerization catalyst to metal component of synthesis gas conversion catalyst is between 2:1 and 100:1; in another embodiment, the ratio is between 5:1 and 25:1; in yet another embodiment, the ratio is between 10:1 and 15:1

The feed gas initially contacts a synthesis gas conversion catalyst in the first upstream layer 4 of the reactor. According to one embodiment, the upstream layer contains a conventional Fischer-Tropsch synthesis gas conversion catalyst. The Fischer-Tropsch synthesis gas conversion catalyst can be any known Fischer-Tropsch synthesis catalyst. Fischer-Tropsch catalysts are typically based on group VIII metals such as, for example, iron, cobalt, nickel and ruthenium. When the feed gas is derived from natural gas, the hydrogen to carbon monoxide ratio is such that carbon is the limiting element; therefore synthesis gas conversion catalysts having low water gas shift activity and suitable for lower temperature reactions, such as cobalt, are preferred. When the feed gas is derived from coal or biomass, the hydrogen to carbon monoxide ratio is lower than in natural gas derived syngas, so that hydrogen is the limiting element; therefore synthesis gas conversion catalysts having higher water gas shift activity, such as iron, are preferred. The synthesis gas conversion catalyst can be supported on any suitable support, such as solid oxides, including but not limited to alumina, silica, titania, magnesia, zirconia, chromia, thoria, boria and mixtures thereof. As a nonlimiting example, the Fischer-Tropsch metal component of the synthesis gas conversion catalyst can be present on the support in an amount between 5% and 50% by weight in the case of cobalt.

According to another embodiment, the synthesis gas conversion catalyst layers 4 contain a hybrid synthesis gas conversion catalyst. A hybrid synthesis gas conversion catalyst (also referred to as a hybrid Fischer-Tropsch catalyst) contains a synthesis gas conversion catalyst in combination with an olefin isomerization catalyst, for example a relatively acidic zeolite, for isomerizing double bonds in $C_{4+}$ olefins as they are formed. In this embodiment, the synthesis gas conversion reaction produces less wax so that less hydrocracking catalyst is needed than in the previously described embodiment. For instance, in this embodiment, the weight ratio of hydrocracking catalyst to synthesis gas conversion catalyst can be between 0.1:1 and 100:1. In one embodiment, the weight ratio of hydrocracking catalyst to synthesis gas conversion catalyst is between 0.2:1 and 10:1; in another embodiment, the ratio is between 0.5:1 and 2.5:1; in yet another embodiment, the ratio is between 1:1 and 1.5:1. Methods for preparing a hybrid catalyst of this type are described in co-pending U.S. patent application Ser. No. 12/343,534, incorporated herein in its entirety by reference. Such a method comprises impregnating a zeolite extrudate using a solution comprising a cobalt salt to provide an impregnated zeolite extrudate and activating the impregnated zeolite extrudate by a reduction-oxidation-reduction cycle. Impregnation of a zeolite using a substantially non-aqueous cobalt solution followed by activation by a reduction-oxidation-reduction cycle reduces cobalt ion-exchange with zeolite acid sites, thereby increasing the overall activity of the zeolite component. The resulting zeolite supported cobalt catalyst comprises cobalt metal distributed as small crystallites upon the zeolite support. It should be understood that as the synthesis gas conversion catalyst activity increases, an increased amount of zeolite may be needed to produce liquid hydrocarbons having the desired product distribution. The impregnation method and the reduction-oxidation-reduction cycle used to activate the catalyst will be described in greater detail below.

Use of zeolite extrudates has been found to be beneficial for use in the hybrid synthesis gas conversion catalyst, for the relatively larger zeolite extrudate particles will cause less pressure drop within a reactor and be subject to less attrition than zeolite powder or even granular zeolite (e.g., having a particle size of about 300-1000 micrometers). Formation of particles from zeolite powder or granular zeolite plus Co/alumina and a binder, to be sized equivalent to zeolite extrudate (i.e., to avoid pressure drop and attrition) would result in blinding of cobalt sites and would probably still result in some ion exchange during the drying and calcination steps, thus lowering the activity and selectivity of the resultant catalyst.

Methods of formation of zeolite extrudates are readily known to those of ordinary skill in the art. Wide variations in macroporosity are possible with such extrudates. For the hybrid synthesis gas conversion catalyst, without wishing to be bound by any theories, it is believed that as high a macroporosity as possible, consistent with high enough crush strength to enable operation in long reactor tubes, will be advantageous in minimizing diffusion constraints on activity and selectivity. The zeolite-mediated Fischer-Tropsch synthesis is not as diffusion-limited as that of normal Fischer-Tropsch synthesis, since the pores of the presently disclosed zeolite supported Fischer-Tropsch catalyst stay open during operation, whereas the pores of a normal Fischer-Tropsch catalyst fill with oil (melted wax).

In extrudate formation, strength is produced in a calcination step at high temperature. The temperature is high enough to cause solid state reactions between cobalt oxides and alumina or aluminosilicate portions of the material, to form very stable, essentially non-reducible phases such as spinels. Consequently, it is vital that the metal be added after the extrudate has been formed and has already undergone calcination.

As used herein, the phrases "hybrid Fischer-Tropsch catalyst" and "hybrid synthesis gas conversion catalyst" are used interchangeably to refer to a Fischer-Tropsch catalyst comprising a Fischer-Tropsch metal component as well as an acidic component containing the appropriate functionality to convert in a single-stage the primary Fischer-Tropsch products into desired products (i.e., minimize the amount of heavier, undesirable products).

As used herein, the phrase "zeolite supported cobalt catalyst" refers to a catalyst wherein cobalt is distributed as small crystallites upon a bound zeolite support. The cobalt content of the zeolite supported cobalt catalyst can depend on the binder (alumina, silica and the like). For example, for an alumina binder content of about 20 weight % to about 99 weight % based upon support weight, the hybrid synthesis gas conversion catalyst can contain, for example, from about 1 to about 20 weight % cobalt, preferably 5 to about 15 weight % cobalt, based on total catalyst weight, at the lowest alumina binder content. At the highest alumina binder content the catalyst can contain, for example, from about 5 to about 30 weight % cobalt, preferably from about 10 to about 25 weight % cobalt, based on total catalyst weight.

The hybrid synthesis gas conversion catalyst can be subjected to an activation procedure comprising the steps, in sequence, of (A) reduction in hydrogen, (B) oxidation in an oxygen-containing gas, and (C) reduction in hydrogen, the activation procedure being conducted at a temperature below 500° C. It has been found that the activation procedure provides acidic component supported cobalt catalyst with improved reaction rates when the catalyst is prepared by impregnation of an acidic component support with cobalt. Moreover, the activation procedure can significantly improve activity of a promoted, hybrid Fischer-Tropsch catalyst, wherein a promoter such as, for example, Ru, Rh, Pd, Cu, Ag, Au, Zn, Cd, Hg, and/or Re has been previously added to improve activity. The hybrid synthesis gas conversion catalyst is produced by subjecting the catalyst to an activation procedure including the steps of (i) reduction, (ii) oxidation, and (iii) reduction, herein termed "ROR activation" while under a temperature below 500° C., for example, below 450° C. By subjecting the catalyst to ROR activation, the activity of the resultant catalyst can be increased by as much as about 100%.

The acidic component for use in the hybrid Fischer-Tropsch catalyst can be selected from amorphous silica-alumina, tungstated zirconia, zeolitic crystalline medium pore molecular sieves, non-zeolitic crystalline medium pore molecular sieves, zeolitic crystalline large and extra large pore molecular sieves, non-zeolitic crystalline large and extra large pore molecular sieves, mesoporous molecular sieves and zeolite analogs. A zeolite is a molecular sieve that contains silica in the tetrahedral framework positions. Examples include, but are not limited to, silica-only (silicates), silica-alumina (aluminosilicates), silica-boron (borosilicates), silica-germanium (germanosilicates), alumina-germanium, silica-gallium (gallosilicates) and silica-titania (titanosilicates), and mixtures thereof.

Molecular sieves, in turn, are crystalline materials that have regular passages (pores). If examined over several unit cells of the structure, the pores will form an axis based on the same units in the repeating crystalline structure. While the overall path of the pore will be aligned with the pore axis, within a unit cell, the pore may diverge from the axis, and it may expand in size (to form cages) or narrow. The axis of the pore is frequently parallel with one of the axes of the crystal. The narrowest position along a pore is the pore mouth. The pore size refers to the size of the pore mouth. The pore size is calculated by counting the number of tetrahedral positions that form the perimeter of the pore mouth. A pore that has 10 tetrahedral positions in its pore mouth is commonly called a 10 membered ring pore. Pores of relevance to catalysis in this application have pore sizes of 8 tetrahedral positions (members) or greater. If a molecular sieve has only one type of relevant pore with an axis in the same orientation to the crystal structure, it is called 1-dimensional. Molecular sieves may have pores of different structures or may have pores with the same structure but oriented in more than one axis related to the crystal.

Small pore molecular sieves are defined herein as those having 8 membered rings; medium pore molecular sieves are defined as those having 10 membered rings; large pore molecular sieves are defined as those having 12 membered rings; extra-large molecular sieves are defined as those having 14+ membered rings.

Mesoporous molecular sieves are defined herein as those having average pore diameters between 2 and 50 nm. Representative examples include the M41 class of materials, e.g. MCM-41, in addition to materials known as SBA-15, TUD-1, HMM-33, and FSM-16.

Exemplary supports of the hybrid synthesis gas conversion catalyst include, but are not limited to, those medium pore molecular sieves designated EU-1, ferrierite, heulandite, clinoptilolite, ZSM-11, ZSM-5, ZSM-57, ZSM-23, ZSM-48, MCM-22, NU-87, SSZ-44, SSZ-58, SSZ-35, SSZ-57, SSZ-74, SUZ-4, Theta-1, TNU-9, IM-5 (IMF), ITQ-13 (ITH), ITQ-34 (ITR), and silicoaluminophosphates designated SAPO-11 (AEL) and SAPO-41 (AFO). The three letter designation is the name assigned by the IUPAC Commission on Zeolite Nomenclature.

Exemplary supports of the hybrid synthesis gas conversion catalyst include, but are not limited to, those large pore molecular sieves designated Beta, CIT-1, Faujasite, Linde Type L, Mordenite, ZSM-10 (MOZ), ZSM-12, ZSM-18 (MEI), MCM-68, gmelinite (GME), cancrinite (CAN), mazzite/omega (MAZ), SSZ-37 (NES), SSZ-41 (VET), SSZ-42 (IFR), SSZ-48, SSZ-60, SSZ-65 (SSF), ITQ-22 (IWW), ITQ-24 (IWR), ITQ-26 (IWS), ITQ-27 (IWV), and silicoaluminophosphates designated SAPO-5 (AFI), SAPO-40 (AFR), SAPO-31 (ATO), SAPO-36 (ATS) and SSZ-51 (SFO).

Exemplary supports of the hybrid synthesis gas conversion catalyst include, but are not limited to, those extra large pore molecular sieves designated CIT-5, UTD-1 (DON), SSZ-53, SSZ-59, and silicoaluminophosphate VPI-5 (VFI).

For convenience, supports for the hybrid synthesis gas conversion catalyst may be herein referred to as "zeolite supports" although it should be understood that this encompasses the above non-zeolitic materials as well as zeolitic materials.

A promoter, such as ruthenium or the like may be included in the hybrid synthesis gas conversion catalyst if desired. For a catalyst containing about 10 weight % cobalt, the amount of ruthenium can be from about 0.01 to about 0.50 weight %, for example, from about 0.05 to about 0.25 weight % based upon total catalyst weight. The amount of ruthenium would accordingly be proportionally higher or lower for higher or lower cobalt levels, respectively. A catalyst level of about 7.5 weight % has been found to be particularly suitable for 80 weight % ZSM-5 and 20 weight % alumina. The amount of cobalt can be increased as amount of alumina increases, up to about 20 weight % Co.

The method employed to deposit catalytic metals onto the zeolite support can involve an impregnation technique using a substantially non-aqueous solution containing soluble cobalt salt and, if desired, a soluble promoter metal salt, e.g., ruthenium salt, in order to achieve the necessary metal loading and distribution required to provide a highly selective and active hybrid synthesis gas conversion catalyst.

Initially, the zeolite support can be treated by oxidative calcination at a temperature in the range of from about 450° to about 900° C., for example, from about 600° to about 750° C. to remove water and any organics from the zeolite support and to dehydroxylate it.

Meanwhile, non-aqueous organic solvent solution of a cobalt salt, and, if desired, aqueous or non-aqueous organic solvent solutions of ruthenium salts, for example, are prepared. Any suitable ruthenium salt, such as ruthenium nitrate, chloride, acetate or the like can be used. Aqueous solutions for the promoters can be used in very small amounts. As used herein, the phrase "substantially non-aqueous" refers to a solution that includes at least 95 volume % non-aqueous solvent. In general, any metal salt which is soluble in the organic solvent and will not have a poisonous effect on the catalyst can be utilized.

The non-aqueous organic solvent is a non-acidic liquid which is formed from moieties selected from the group consisting of carbon, oxygen, hydrogen and nitrogen, and possesses a relative volatility of at least 0.1. The phrase "relative volatility" refers to the ratio of the vapor pressure of the solvent to the vapor pressure of acetone, as reference, when measured at 25° C.

Suitable solvents include, for example, ketones, such as acetone, butanone (methyl ethyl ketone); the lower alcohols, e.g., methanol, ethanol, propanol and the like; amides, such as dimethyl formamide; amines, such as butylamine; ethers, such as diethylether and tetrahydrofuran; hydrocarbons, such as pentane and hexane; and mixtures of the foregoing solvents. The solvents can be, for instance, acetone or tetrahydrofuran.

Suitable cobalt salts include, for example, cobalt nitrate, cobalt acetate, cobalt carbonyl, cobalt acetylacetonate, or the like. Likewise, any suitable ruthenium salt, such as ruthenium nitrate, chloride, acetate or the like can be used. In an embodiment, ruthenium acetylacetonate is used. In general, any metal salt which is soluble in the organic solvent and will not have a poisonous effect on the metal catalyst or on the acid sites of the zeolite can be utilized.

The calcined zeolite support is then impregnated in a dehydrated state with the substantially non-aqueous, organic solvent solution of the metal salts. Thus, the calcined zeolite support should not be unduly exposed to atmospheric humidity so as to become rehydrated.

Any suitable impregnation technique can be employed including techniques well known to those skilled in the art so as to distend the catalytic metals in a uniform thin layer on the catalyst zeolite support. For example, the cobalt along with the oxide promoter can be deposited on the zeolite support material by the "incipient wetness" technique. Such technique is well known and requires that the volume of substantially non-aqueous solution be predetermined so as to provide the minimum volume which will just wet the entire surface of the zeolite support, with no excess liquid. Alternatively, the excess solution technique can be utilized if desired. If the excess solution technique is utilized, then the excess solvent present, e.g., acetone, is merely removed by evaporation.

Next, the substantially non-aqueous solution and zeolite support are stirred while evaporating the solvent at a temperature of from about 25° to about 50° C. until "dryness."

The impregnated catalyst is slowly dried at a temperature of from about 110° to about 120° C. for a period of about 1 hour so as to spread the metals over the entire zeolite support. The drying step is conducted at a very slow rate in air.

The dried catalyst may be reduced directly in hydrogen or it may be calcined first. In the case of impregnation with cobalt nitrate, direct reduction can yield a higher cobalt metal dispersion and synthesis activity, but reduction of nitrates is difficult to control and calcination before reduction is safer for large scale preparations. Also, calcinations to decompose nitrates are simpler if multiple impregnations are needed to provide the desired metal loading. Reduction in hydrogen requires a prior purge with inert gas, a subsequent purge with inert gas and a passivation step in addition to the reduction itself, as described later as part of the ROR activation. However, impregnation of cobalt carbonyl must be carried out in a dry, oxygen-free atmosphere, and it must be decomposed directly and then passivated if the benefits of its lower oxidation state are to be maintained.

The dried catalyst is calcined by heating in flowing air, for example 10 cc/gram/minute, to a temperature in the range of from about 200° to about 350° C., for example, from about 250° to about 300° C., that is sufficient to decompose the metal salts and fix the metals. The aforesaid drying and calcination steps can be done separately or can be combined. However, calcination should be conducted by using a slow heating rate of, for example, 0.5° to about 3° C. per minute or from about 0.5° to about 1° C. per minute and the catalyst should be held at the maximum temperature for a period of about 1 to about 20 hours, for example, for about 2 hours.

The foregoing impregnation steps are repeated with additional substantially non-aqueous solutions in order to obtain the desired metal loading. Ruthenium and other promoter metal oxides are conveniently added together with cobalt, but they may be added in other impregnation steps, separately or in combination, either before, after, or between impregnations of cobalt.

After the last impregnation sequence, the loaded catalyst zeolite support is then subjected to the ROR activation treatment. The ROR activation treatment of the present disclosure must be conducted at a temperature considerably below 500° C. in order to achieve the desired increase in activity and selectivity of the cobalt-impregnated hybrid synthesis gas conversion catalyst. Temperatures of 500° C. or above reduce activity and liquid hydrocarbon selectivity of the cobalt-impregnated catalyst. Suitable ROR activation temperatures are below 500° C., preferably below 450° C. and most preferably, at or below 400° C. Thus, ranges of 100° or 150° to 450° C., for example, 250° to 400° C. are suitable for the reduction steps. The oxidation step should be limited to 200° to 300° C. These activation steps are conducted while heating at a rate from about 0.1° to about 5° C., for example, from about 0.1° to about 2° C.

The impregnated catalyst can be slowly reduced in the presence of hydrogen. If the catalyst has been calcined after each impregnation, to decompose nitrates or other salts, then the reduction may be performed in one step, after an inert gas purge, with heating in a single temperature ramp (e.g., 1° C./min.) to the maximum temperature and held at that temperature, from about 250° or 300° to about 450° C., for example, from about 350° to about 400° C., for a hold time of 6 to about 65 hours, for example, from about 16 to about 24 hours. Pure hydrogen is preferred in the first reduction step. If nitrates are still present, the reduction is best conducted in two steps wherein the first reduction heating step is carried out at a slow heating rate of no more than about 5° C. per minute, for example, from about 0.1° to about 1° C. per minute up to a maximum hold temperature of 200° to about 300° C., for example, 200° to about 250° C., for a hold time from about 6 to about 24 hours, for example, from about 16 to about 24 hours under ambient pressure conditions. In the second treating step of the first reduction, the catalyst can be heated at from about 0.5° to about 3° C. per minute, for example, from about 0.1° to about 1° C. per minute to a maximum hold temperature from about 250° or 300° up to about 450° C., for example, from about 350° to about 400° C. for a hold time of 6 to about 65 hours, for example, from about 16 to about 24 hours. Although pure hydrogen is preferred for these reduction steps, a mixture of hydrogen and nitrogen can be utilized.

Thus, the reduction may involve the use of a mixture of hydrogen and nitrogen at 100° C. for about one hour; increasing the temperature 0.5° C. per minute until a temperature of 200° C.; holding that temperature for approximately 30 minutes; and then increasing the temperature 1° C. per minute until a temperature of 350° C. is reached and then continuing the reduction for approximately 16 hours. Reduction should be conducted slowly enough and the flow of the reducing gas maintained high enough to maintain the partial pressure of water in the off-gas below 1%, so as to avoid excessive steaming of the exit end of the catalyst bed. Before and after all reductions, the catalyst must be purged in an inert gas such as nitrogen, argon or helium.

The reduced catalyst is passivated at ambient temperature (25°-35° C.) by flowing diluted air over the catalyst slowly enough so that a controlled exotherm of no larger than +50° C. passes through the catalyst bed. After passivation, the catalyst is heated slowly in diluted air to a temperature of from about 300° to about 350° C. (preferably 300° C.) in the same manner as previously described in connection with calcination of the catalyst.

The temperature of the exotherm during the oxidation step should be less than 100° C., and will be 50-60° C. if the flow rate and/or the oxygen concentration are dilute enough. If it is even less, the oxygen is so dilute that an excessively long time will be needed to accomplish the oxidation. There is a danger in exceeding 300° C. locally, since cobalt oxides interact with alumina and silica at temperatures above 400° C. to make irreducible spinels, and above 500° C., Ru makes volatile, highly toxic oxides.

Next, the reoxidized catalyst is then slowly reduced again in the presence of hydrogen, in the same manner as previously described in connection with the initial reduction of the impregnated catalyst. This second reduction is much easier than the first. Since nitrates are no longer present, this reduction may be accomplished in a single temperature ramp and hold, as described above for reduction of calcined catalysts. Usually, the hold temperature for a second reduction need be no higher than 200° C.-250° C., so it can be done in the synthesis reactor. According to yet another embodiment, the upstream layer 4 contains a mixture of conventional Fischer-Tropsch catalyst and a hybrid synthesis gas conversion catalyst, wherein the layer contains between about 1 and about 99 weight % conventional Fischer-Tropsch catalyst and about 1 and about 99 weight % hybrid synthesis gas conversion catalyst, based on total catalyst weight.

According to one embodiment, the hydrocracking catalyst layers 5 contain an acid catalyst material for cracking straight chain hydrocarbons. Suitable hydrocracking catalysts include any of the previously listed suitable materials for use as the acidic component in the hybrid Fischer-Tropsch catalyst.

The hydrocracking catalyst can optionally contain a metal promoter. The metal promoter is typically a metal or combination of metals selected from Group VIII noble and non-noble metals and Group VIB metals. Noble metals and the like which can be used include platinum, palladium, rhodium, ruthenium, osmium, silver, gold, rhenium and iridium, or any combination thereof.

The metal promoter can be incorporated into the hydrocracking catalyst by any one of numerous procedures. It can be added either to the cracking component, to the support or a combination of both. In the alternative, the Group VIII components can be added to the cracking component or matrix component by co-mulling, impregnation, or ion exchange and the Group VI components, i.e., molybdenum and tungsten can be combined with the refractory oxide by impregnation, co-mulling or co-precipitation. These components are usually added as a metal salt which can be thermally converted to the corresponding oxide in an oxidizing atmosphere or reduced to the metal with hydrogen or other reducing agent.

The hydroisomerization catalyst layers 7 contain a hydroisomerization catalyst for hydroisomerizing straight chain hydrocarbons. The hydroisomerization catalyst is a bifunctional catalyst containing a hydrogenation or isomerization component comprising a metal promoter and an acidic component. The hydroisomerization catalyst can be selected from 10-ring and larger zeolites. Suitable materials for use as the hydroisomerization catalyst include, as not limiting examples, SSZ-32, ZSM-57, ZSM-48, ZSM-22, ZSM-23, SAPO-11 and Theta-1. The hydroisomerization catalysts can also be non-zeolitic materials.

The reaction temperature is suitably from about 160° C. to about 260° C., for example, from about 175° C. to about 250° C. or from about 185° C. to about 235° C. Higher reaction temperatures favor lighter products. The total pressure is, for example, from about 1 to about 100 atmospheres (gauge), for example, from about 3 to about 35 atmospheres or from about 5 to about 20 atmospheres. Higher reaction pressures favor heavier products as they favor the synthesis reactions over the hydrocracking and hydroisomerization reactions. The gaseous hourly space velocity based upon the total amount of feed is less than 20,000 volumes of gas per volume of catalyst per hour, for example, from about 100 to about 5000 v/v/hour or from about 1000 to about 2500 v/v/hour.

Fixed bed reactor systems have been developed for carrying out the Fischer-Tropsch reaction. Such reactors are suitable for use in the present process. For example, suitable Fischer-Tropsch reactor systems include multi-tubular fixed bed reactors the tubes of which are loaded with the upstream and downstream catalyst layers.

The present process provides for a high yield of paraffinic hydrocarbons in the naphtha range ($C_5$-$C_{12}$) under essentially the same reaction conditions as the synthesis gas conversion. The hydrocarbon mixture 8 produced is liquid at about 0° C. The process results in the following composition:

0-20, for example, 5-15 or 8-12, weight % $CH_4$;
0-20, for example, 5-15 or 8-12, weight % $C_2$-$C_4$;
greater than 70, for example, 70-95 weight % $C_{5+}$; and
40-80, for example, 40-60 weight % $C_5$-$C_{12}$.

In one embodiment, the hydrocarbon mixture produced is substantially free of solid wax by which is meant that the product is a single liquid phase at ambient conditions without the visibly cloudy presence of an insoluble solid wax phase. According to this embodiment, the hydrocarbon mixture produced contains 0-5 weight % $C_{21+}$ normal paraffins at ambient conditions.

By "ambient conditions" is meant a temperature of 15° C. and a pressure of 1 atmosphere.

In a typical Fischer-Tropsch process, the product obtained is predominantly a normal or linear paraffin product, meaning free of branching. If the $C_{21+}$ fraction present within a $C_{5+}$ product is predominantly linear and greater than 5 weight %, the product has been found to contain a separate, visible solid wax phase. Products of the present process may actually contain $C_{21+}$ at greater than 5 weight % without a visible solid wax phase. Branched paraffins have lower melting points compared with normal or linear paraffins such that products of the present process can contain a greater percentage of $C_{21+}$ fraction and still remain a liquid which is free of a separate, visible solid wax phase at ambient conditions. The result is a product which is liquid and pourable at ambient conditions. Liquid hydrocarbons produced by the present process advantageously have a cloud point as determined by ASTM D 2500-09 of 15° C. or less, even 10° C. or less, even 5° C. or less, and even as low as 2° C.

In addition, the present process provides for a high yield of paraffinic hydrocarbons in the naphtha range without the need for separation of products arising from any particular catalyst layer and without the need for a second reactor containing catalyst for hydrocracking and/or hydroisomerization. Process water arising from the first catalyst layer is not required to be separated from the reactor during the hydroisomerization of said $C_{21+}$ normal paraffins. It has been found that with a proper combination of catalyst composition, catalyst layer placement and reaction conditions, both the synthesis gas conversion reaction and the subsequent hydrocracking and/or hydroisomerization reactions can be conducted within a single reactor under essentially common process conditions. Furthermore, by including multiple alternating catalyst layers, the heat released by the gas conversion reaction can be evenly distributed throughout the reactor.

While it is not required, under certain circumstances it may be desirable to run the present process using an optional second reactor 16 for further hydrocracking and/or hydroisomerization or to provide backup hydrocracking and/or hydroisomerization capacity, resulting in product stream 26. Also optionally, the present process can be run with the addition of makeup hydrogen (not shown).

EXAMPLES

Catalyst Preparation Methods

Preparation of Synthesis Gas Conversion Catalyst Comprising 20% Cobalt-0.5% Ruthenium-3% Zirconium Supported on Silica The catalyst was prepared using a $SiO_2$ support obtained from Aldrich (Davisil grade 643, having a BET surface area of 300 $m^2$/g and a pore volume of 1.15 cc/g) which was modified with 3% Zr by impregnation. The modified support was dried for 2 hrs at 120° C. and calcined in air for 2 hrs at 500° C. A three-step incipient wetness impregnation method was used to add the cobalt and ruthenium. A solution was prepared by dissolving 62.12 g of cobalt(II) nitrate hexahydrate (obtained from Sigma-Aldrich) and 1.0046 g of ruthenium(III) nitrosyl nitrate (obtained from Alfa Aesar) in water. 50 g of the Zr-modified silica support prepared above was impregnated by using ⅓ of the cobalt-ruthenium solution to achieve incipient wetness. The prepared catalyst was then dried in air at 120° C. for 16 hours in a box furnace and then it was subsequently calcined in air by raising its temperature at a heating rate of 1° C./min to 300° C. and holding it at that temperature for 2 hours before cooling it back to ambient temperature. The incipient wetness impregnation procedure was repeated to obtain the following loading of Co and Ru on the support: 20 wt % Co and 0.5% Ru on 3% Zr/silica.

The catalyst was activated in situ in test reactors as follows: 150 mg portions of catalyst, sized to 125-160 μm diameters, were charged to individual reactor tubes in a 16-reactor, parallel testing unit. The reactor tubes were 5 mm ID stainless steel tubes with isothermal sections of approximately 10 cm in length (2 mL in volume). The catalysts were each diluted to four times their original volume with α-alumina. A gas feed of 3.75 liters per reactor per hour of 96% hydrogen and 4% argon by volume was passed through the catalyst bed at a pressure of 10 atm. The temperature of the reactor was increased to 150° C. at a rate of 0.5° C./minute and held constant for three hours, then increased to 250° C. at a rate of 0.5° C./minute and held constant for three hours, then increased to 350° C. at a rate of 0.5° C./minute and then held constant for 12 hours. After this time, the catalysts were cooled in hydrogen to 100° C. and held at that temperature. The gas feed was switched to nitrogen (96% nitrogen, 4% argon by volume) and the nitrogen flow was continued for five hours to purge the system. Then a gas mixture of 5/91/4 volume % $O_2/N_2/Ar$ was passed through the catalyst bed for six hours at 100° C. The temperature of the reactor was then increased from 100° C. to 300° C. at a rate of 1° C./minute and held constant at 300° C. for six hours. The gas feed was then switched again to a nitrogen purge and the temperature was allowed to drop to 100° C. and held constant for 16 hours. Finally, the gas feed was changed to hydrogen again, and the temperature was raised to 250° C. at a rate of 0.25° C./minute and then held constant for 12 hours before being allowed to drop to 150° C. All of the gas flows were at a flow rate of 62.5 ml/min per reactor at a pressure of 10 atm.

Preparation of Hydrocracking Catalyst Comprising 1.0% Pt Supported on ZSM-5 (80% ZSM-5, 20% Alumina)

2.493 g of tetraammineplatinum(II) nitrate (obtained from Aldrich) was dissolved in 60 cc of water. The resulting solution was added to 125.1 g CBV 8014 zeolite (obtained from Zeolyst International) extrudates. Most of the water was removed in a rotary evaporator under vacuum by heating slowly to 65° C. The vacuum-dried material was then further dried in an oven at 120° C. overnight. The dried catalyst was calcined at 300° C. for 2 hours in a muffle furnace.

Preparation of Hydroisomerization Catalyst Comprising 1.0% Pd Supported on SSZ-32

28.34 g of tetraamminepalladium(II) nitrate solution, 10 wt % in H2O (obtained from Aldrich) was dissolved in 100 cc of water. The resulting solution was added to 100 g of SSZ-32 base zeolite available from Chevron USA Inc. Most of the water was removed in a rotary evaporator under vacuum by heating slowly to 65° C. The vacuum-dried material was then further dried in an oven at 120° C. overnight. The dried catalyst was calcined at 300° C. for 2 hours in a muffle furnace.

Example 1

Synthesis Gas Conversion, Hydrocracking and Hydroisomerization Using Synthesis Gas Conversion Catalyst and a Mixture of Hydrocracking and Hydroisomerization Catalyst in a Multiple Alternating Layer Arrangement Three portions of approximately 50 mg each of synthesis gas conversion catalyst prepared as described above sized to 125-160 μm were diluted to four times their original volume with α-alumina sized to 125-160 μm. Separately, three portions of approximately 63.1 mg each of 1.0 wt % Pt/ZSM-5 hydrocracking catalyst prepared as described above were each combined with approximately 67.3 mg of a 1.0 wt % Pd/SSZ-32 hydroisomerization catalyst, also prepared as described above. Both types of zeolite catalyst were sized to a particle diameter of 125-160 μm. A 5 mm inner diameter reactor tube was loaded in an alternating layer arrangement with one portion of the mixture of hydrocracking catalyst and hydroisomerization catalyst as the most downstream catalyst layer, and one portion of the synthesis gas conversion catalyst above that hydrocracking/hydroisomerization catalyst layer; this configuration was repeated three times for a total of six layers such that the total amount of synthesis gas conversion catalyst was 150 mg, the total amount of hydrocracking catalyst was 189.4 mg and the total amount of hydroisomerization catalyst was 202.0 mg.

The layers were activated in situ by the procedure outlined above in the preparation method of the synthesis gas conversion catalyst. After the last step in the activation, with the catalysts in 96% $H_2$/4% Ar flow at 150° C., CO was exchanged in for one third of the hydrogen, while the flow was maintained at 40 sccm (0° C., 1 atm) per reactor. The temperature was then raised at about 1° C./min. to 180° C. and held at that temperature for a day.

After a 200-hour break-in period at 215° C., 10 atm, and H2/CO=2 at 40 sccm/reactor, the catalyst layers were then subjected to synthesis conditions in which the catalyst was contacted with hydrogen and carbon monoxide at a ratio of 1.5, at a temperature of 225° C., at total pressure of 10-20 atm (gauge).

Comparative Example 1

Synthesis Gas Conversion Using Synthesis Gas Conversion Catalyst in a Single Catalyst Bed Approximately 150 mg of synthesis gas conversion catalyst prepared as described above sized to 125-160 μm was diluted four times by volume with α-alumina, also sized to 125-160 μm. A 5 mm inner diameter reactor tube was loaded with the catalyst. The catalyst was activated in situ by the procedure outlined above in the preparation method of the synthesis gas conversion catalyst.

The catalyst bed was subjected to synthesis conditions in which the catalyst was contacted with hydrogen and carbon monoxide at a ratio of 1.5 at a temperature of 225° C. with a total pressure of 10-20 atm at flow rates of 20-40 sccm per reactor (varied to change percent conversion) using a high-throughput screening reactor as supplied by hte AG (Heidelberg, Germany). The process conditions and results are set forth in Table 1.

Comparative Example 2

Synthesis Gas Conversion, Hydrocracking and Hydroisomerization Using Synthesis Gas Conversion, Hydrocracking and Hydroisomerization Catalysts in a Single Stacked Bed Arrangement Approximately 150 mg of synthesis gas conversion catalyst prepared as described above sized to 125-160 μm was diluted four times by volume with α-alumina, also sized to 125-160 μm. 189.4 mg of hydrocracking catalyst (approximately 150 mg zeolite) prepared as described above was sized to 125-160 μm. 202 mg of hydroisomerization catalyst prepared as described above was sized to 125-160 μm. A 5 mm inner diameter reactor tube was loaded in a "stacked bed"

arrangement with a physical mixture of the hydroisomerization catalyst and the hydrocracking catalyst as the lower or downstream catalyst bed and the synthesis gas conversion catalyst as the upper or upstream catalyst bed. The beds were activated in situ by the procedure outlined above in the preparation method of the synthesis gas conversion catalyst.

The dual catalyst beds were subjected to synthesis conditions in which the catalyst was contacted with hydrogen and carbon monoxide at a ratio of 1.5 at a temperature of 225° C. at a total pressure of 10-20 atm using a high-throughput screening reactor as supplied by hte AG (Heidelberg, Germany). The process conditions and results are set forth in Table 1.

The test conditions and the resulting product compositions are given in Table 1. The products were analyzed by gas chromatography.

It can be seen from the results that a catalyst configuration where the synthesis gas conversion catalyst, the hydrocracking catalyst and the hydroisomerization catalyst are positioned in multiple alternating layer arrangement (Example 1) yields a greater percentage of naphtha range ($C_5$-$C_{12}$) product without a significant increase in light gas production and without production of $C_{21+}$ products at the lower pressure. At the higher pressure, Example 1 yields a greater percentage of naphtha range product without an increase in light gas production and with very little $C_{21+}$ products.

TABLE 1

|  | Comparative Example 1 FTS Only | | Comparative Example 2 Two Layers | | Example 1 Six Layers | |
| --- | --- | --- | --- | --- | --- | --- |
| TOS, hours | 1110 | 880 | 1110 | 880 | 1110 | 880 |
| Temperature, ° C. | 225 | 225 | 225 | 225 | 225 | 225 |
| Pressure, bar | 10 | 20 | 10 | 20 | 10 | 20 |
| Inlet $H_2$/CO | 1.5 | 1.5 | 1.5 | 1.5 | 1.5 | 1.5 |
| GHSV, $hr^{-1}$ | 900 | 900 | 900 | 900 | 900 | 900 |
| Mol % CO conversion, | 22.4 | 29.4 | 22.5 | 28.9 | 22.3 | 29.2 |
| Selectivity, $C_1$, % | 14.7 | 12.6 | 13.0 | 12.5 | 12.6 | 13.3 |
| Selectivity, $C_{1-3}$, % | 21.4 | 18.4 | 22.7 | 20.4 | 22.0 | 21.6 |
| Selectivity, $C_{3-4}$, % | 11.8 | 10.9 | 18.5 | 13.0 | 19.8 | 14.8 |
| Selectivity, $C_{5-9}$, % | 30.9 | 27.0 | 44.0 | 30.1 | 48.3 | 37.0 |
| Selectivity, $C_{5-12}$, % | 44.5 | 39.3 | 57.2 | 42.7 | 58.4 | 48.7 |
| Selectivity, $C_{5+}$, % | 71.6 | 75.2 | 66.0 | 72.2 | 65.3 | 69.7 |
| Selectivity, $C_{10+}$, % | 40.8 | 48.1 | 22.0 | 42.1 | 17.0 | 32.7 |
| Selectivity, $C_{21+}$, % | 15.5 | 21.8 | 0.0 | 15.0 | 0.0 | 8.4 |

Where permitted, all publications, patents and patent applications cited in this application are herein incorporated by reference in their entirety, to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "include" and its variants, are intended to be non-limiting, such that recitation of items in a list is not to the exclusion of other like items that may also be useful in the materials, compositions and methods of this invention.

What is claimed is:

1. A process for converting synthesis gas to a hydrocarbon mixture comprising contacting a feed comprising a mixture of carbon monoxide and hydrogen with at least two layers of synthesis gas conversion catalyst particles including a metal component, and at least two layers containing hydrocracking catalyst particles including an acidic component and hydroisomerization catalyst particles, in an alternating arrangement within a single reactor tube, such that the feed contacts at least a first synthesis gas conversion catalyst layer, a first hydrocracking and hydroisomerization catalyst layer, a second synthesis gas conversion catalyst layer and a second hydrocracking and hydroisomerization catalyst layer sequentially, thereby resulting in a hydrocarbon mixture which at ambient conditions contains:
   0-20 weight % $CH_4$;
   0-20 weight % $C_2$-$C_4$;
   greater than 70% $C_{5+}$; and
   40-80 weight % $C_5$-$C_{12}$.

2. The process of claim 1 wherein the process occurs at an essentially common reactor temperature and an essentially common reactor pressure.

3. The process of claim 1 wherein the hydrocarbon mixture further contains 0-5 weight % $C_{21+}$ normal paraffins.

4. The process of claim 1 wherein each of the synthesis gas conversion catalyst particles and the hydrocracking catalyst particles have an average particle diameter, respectively, and each synthesis gas conversion catalyst layer has a thickness at least two times the average particle diameter of the synthesis gas conversion catalyst particles, and each hydrocracking and hydroisomerization catalyst layer has a thickness at least two times the average particle diameter of the hydrocracking and hydroisomerization catalyst particles.

5. The process of claim 4 wherein the particle diameter of each of the synthesis gas conversion catalyst particles and the hydrocracking catalyst particles is between about 1 mm and about 5 mm.

6. The process of claim 1 wherein the weight ratio of the acidic component of the hydrocracking catalyst and the isomerization component of the hydroisomerization catalyst to the metal component of the synthesis gas conversion catalyst is between 2:1 and 100:1.

7. The process of claim 1 wherein the synthesis gas conversion catalyst comprises cobalt on a solid oxide support.

8. The process of claim 1 wherein the synthesis gas conversion catalyst comprises ruthenium on a solid oxide support.

9. The process of claim 7 or 8 wherein the solid oxide support is selected from the group consisting of alumina, silica, titania, magnesia, zirconia, chromia, thoria, boria and mixtures thereof.

10. The process of claim 1 wherein the synthesis gas conversion catalyst further comprises an acidic component.

11. The process of claim 10 wherein the weight ratio of the acidic component of the hydrocracking catalyst to the metal component of the synthesis gas conversion catalyst is between 0.1:1 and 100:1.

12. The process of claim 1 wherein the hydrocracking catalyst is selected from the group consisting of amorphous silica-alumina, tungstated zirconia, zeolitic crystalline medium pore molecular sieves, non-zeolitic crystalline medium pore molecular sieves, zeolitic crystalline large and extra large pore molecular sieves, non-zeolitic crystalline large and extra large pore molecular sieves, mesoporous molecular sieves and zeolite analogs.

13. The process of claim 1 wherein the reactor temperature is between about 160° C. and about 300° C.

14. The process of claim 1 wherein the synthesis gas conversion catalyst further comprises a promoter selected from the group consisting of Mn, Pr, Rh, Pt, Pd, Cu, Ag, Au, Zn, Cd, Re, Ni, K, Cr, Zr, and Ce.

15. The process of claim 1 wherein the synthesis gas conversion catalyst further comprises a promoter selected from the group consisting of magnesium oxides, lanthanum oxides, manganese oxides, zirconium oxides and titanium oxides.

16. The process of claim 1 wherein the reactor pressure is between about 3 atmospheres and about 35 atmospheres.

17. The process of claim 1 wherein the hydrocarbon mixture is substantially free of solid wax at ambient conditions.

18. The process of claim 1 wherein the hydrocarbon mixture has a cloud point no greater than 15° C.

19. A process for converting synthesis gas to a hydrocarbon mixture comprising contacting a feed comprising a mixture of carbon monoxide and hydrogen with at least two layers of synthesis gas conversion catalyst particles including a metal component, at least two layers of hydrocracking catalyst particles including an acidic component, and at least two layers of hydroisomerization catalyst particles, in an alternating layer arrangement within a single reactor tube, such that the feed contacts a first synthesis gas conversion catalyst layer, a first hydrocracking catalyst layer, a first hydroisomerization catalyst layer, a second synthesis gas conversion catalyst layer, sequentially, followed by a second hydrocracking catalyst layer and a second hydroisomerization catalyst layer, in any order, thereby resulting in a hydrocarbon mixture which at ambient conditions contains:

0-20 weight % $CH_4$;
0-20 weight % $C_2$-$C_4$;
greater than 70% $C_{5+}$; and
40-80 weight % $C_5$-$C_{12}$.

20. A process for converting synthesis gas to a hydrocarbon mixture comprising contacting a feed comprising a mixture of carbon monoxide and hydrogen with at least two layers of synthesis gas conversion catalyst particles including a metal component, at least two layers of hydrocracking catalyst particles including an acidic component, and at least two layers of hydroisomerization catalyst particles, in an alternating layer arrangement within a single reactor tube, such that the feed contacts a first synthesis gas conversion catalyst layer, a first hydroisomerization catalyst layer, a first hydrocracking catalyst layer, a second synthesis gas conversion catalyst layer, sequentially, followed by a second hydrocracking catalyst layer and a second hydroisomerization catalyst layer, in any order, thereby resulting in a hydrocarbon mixture which at ambient conditions contains:

0-20 weight % $CH_4$;
0-20 weight % $C_2$-$C_4$;
greater than 70% $C_{5+}$; and
40-80 weight % $C_5$-$C_{12}$.

* * * * *